United States Patent
Dally et al.

(10) Patent No.: US 6,807,186 B2
(45) Date of Patent: Oct. 19, 2004

(54) ARCHITECTURES FOR A SINGLE-STAGE GROOMING SWITCH

(75) Inventors: William J. Dally, Stanford, CA (US); John Edmondson, Arlington, MA (US); Donald A. Priore, Groton, MA (US); Ephrem Wu, San Mateo, CA (US); John W. Poulton, Chapel Hill, NC (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/052,233

(22) Filed: Jan. 17, 2002

(65) Prior Publication Data

US 2002/0181482 A1 Dec. 5, 2002

Related U.S. Application Data

(60) Provisional application No. 60/287,252, filed on Apr. 27, 2001.

(51) Int. Cl.[7] .............................................. H04L 12/28
(52) U.S. Cl. ...................................... 370/413; 370/360
(58) Field of Search ............................... 370/216–218, 370/219, 230–236, 351, 352, 354, 357, 359, 360–364, 369, 370–376, 413

(56) References Cited

U.S. PATENT DOCUMENTS

| | | | | |
|---|---|---|---|---|
| 3,735,049 A | | 5/1973 | Buchner et al. | 179/15 AQ |
| 3,736,381 A | | 5/1973 | Johnson et al. | 179/15 AQ |
| 3,927,267 A | | 12/1975 | Voyer et al. | 179/15 AT |
| 4,623,996 A | * | 11/1986 | McMillen | 370/418 |
| 4,967,405 A | * | 10/1990 | Upp et al. | 359/135 |
| 5,459,724 A | | 10/1995 | Jeffrey et al. | 370/60 |
| 5,583,861 A | | 12/1996 | Holden | 370/395 |
| 6,058,119 A | * | 5/2000 | Engbersen et al. | 370/466 |
| 6,091,728 A | * | 7/2000 | Lazraq et al. | 370/395.7 |

OTHER PUBLICATIONS

Benes, V. E., "On Rearrangeable Three–Stage Connecting Networks," The Bell System Technical Journal, vol. XLI, No. 5, Sep. 1962, pp. 1481–1492.

Clos, Charles, "A Study of Non–Blocking Switching Networks," The Bell System Technical Journal, vol. XXXII, Mar. 1953, pp. 406–424.

"Lucent Technologies introduces cross–connect chip for high–speed optical networking systems," Sep. 25, 2000, http://www.chipcenter.com/telecommunications/mdp/webscan/mn00e/mn00e016.htm; 2 pages.

"900–Series DSX (Digital Signal Cross–Connect) System," 1996, http/connectivity1.avaya.com/exchangemax/fact_sheets/pdf/2883fs–3.pdf, 6 pages.

* cited by examiner

Primary Examiner—Wellington Chin
Assistant Examiner—Raj Jain
(74) Attorney, Agent, or Firm—Hamilton, Brook, Smith & Reynolds, P.C.

(57) ABSTRACT

A single-stage grooming switch is provided for switching streams of multiplexed traffic, such as SONET STS-48, in both time and space domains. In particular, the switch implements a distributed demultiplexing architecture for switching between any input timeslot to any output timeslot at a reduced layout size. Furthermore, the distributed demultiplexing architecture results in low latencies being associated with reconfiguration of output permutations on the order of nanoseconds.

61 Claims, 12 Drawing Sheets

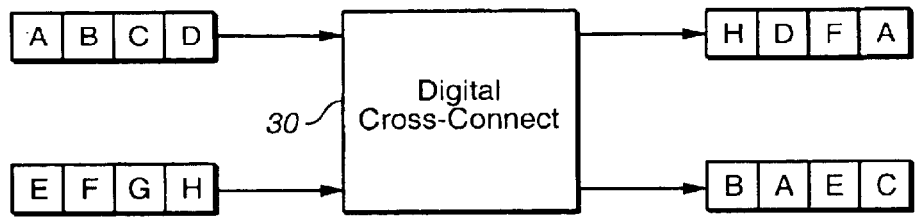
FIG._1 (PRIOR ART)
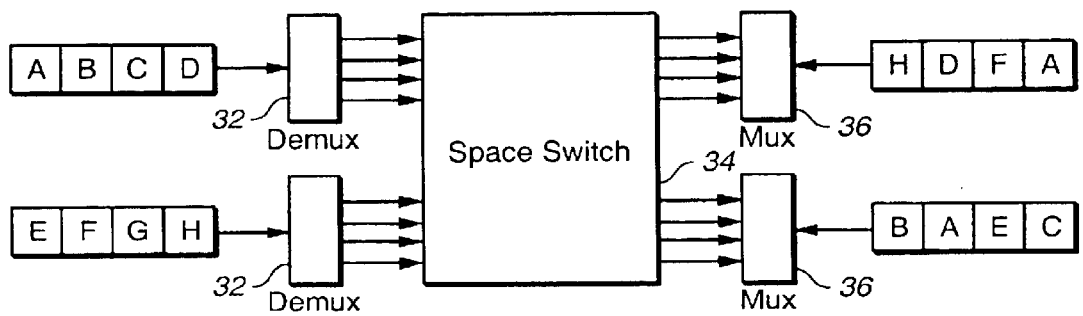
FIG._2 (PRIOR ART)
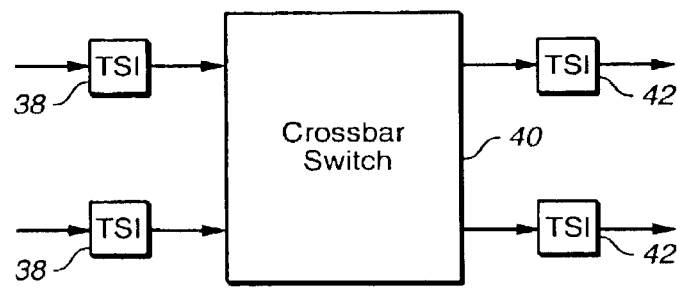
FIG._3 (PRIOR ART)

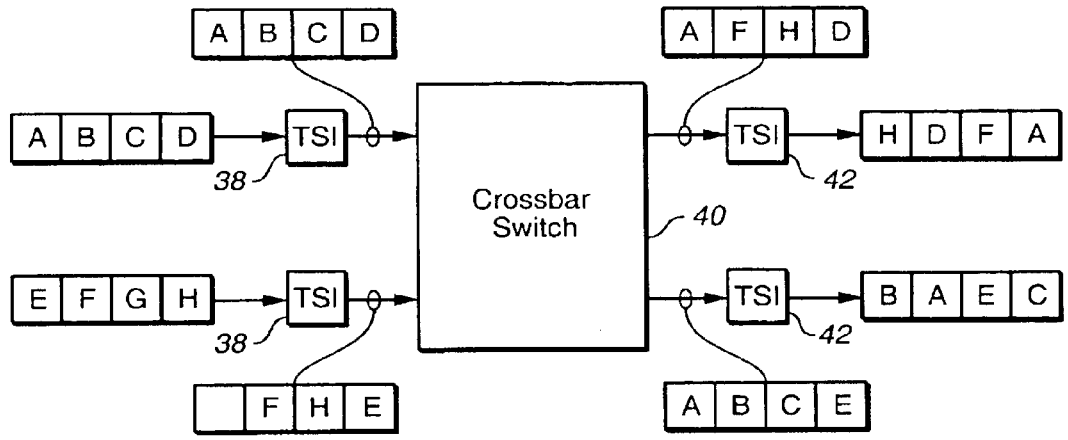
FIG._4 (PRIOR ART)
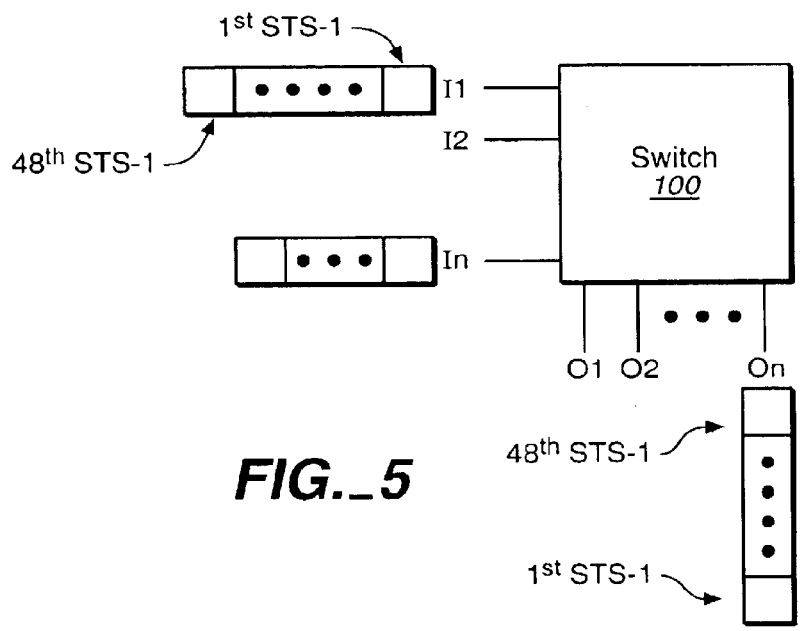
FIG._5

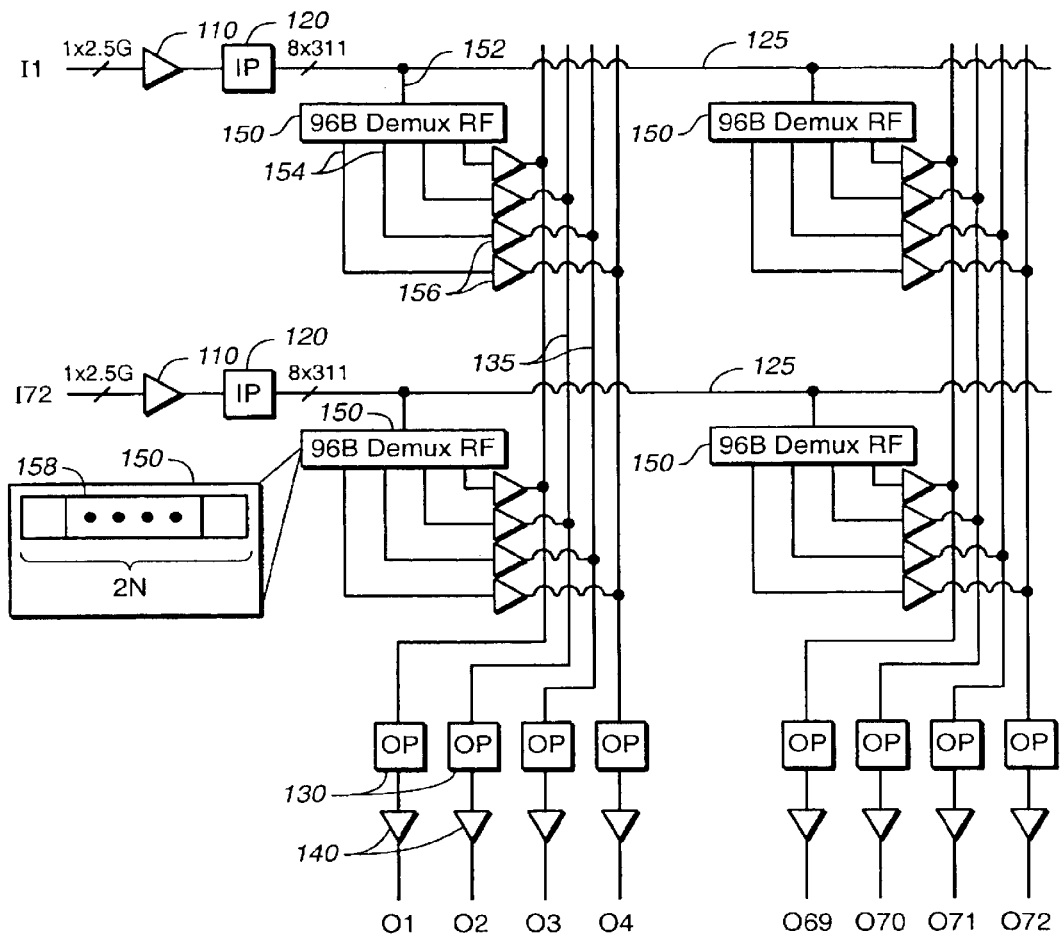
FIG._6

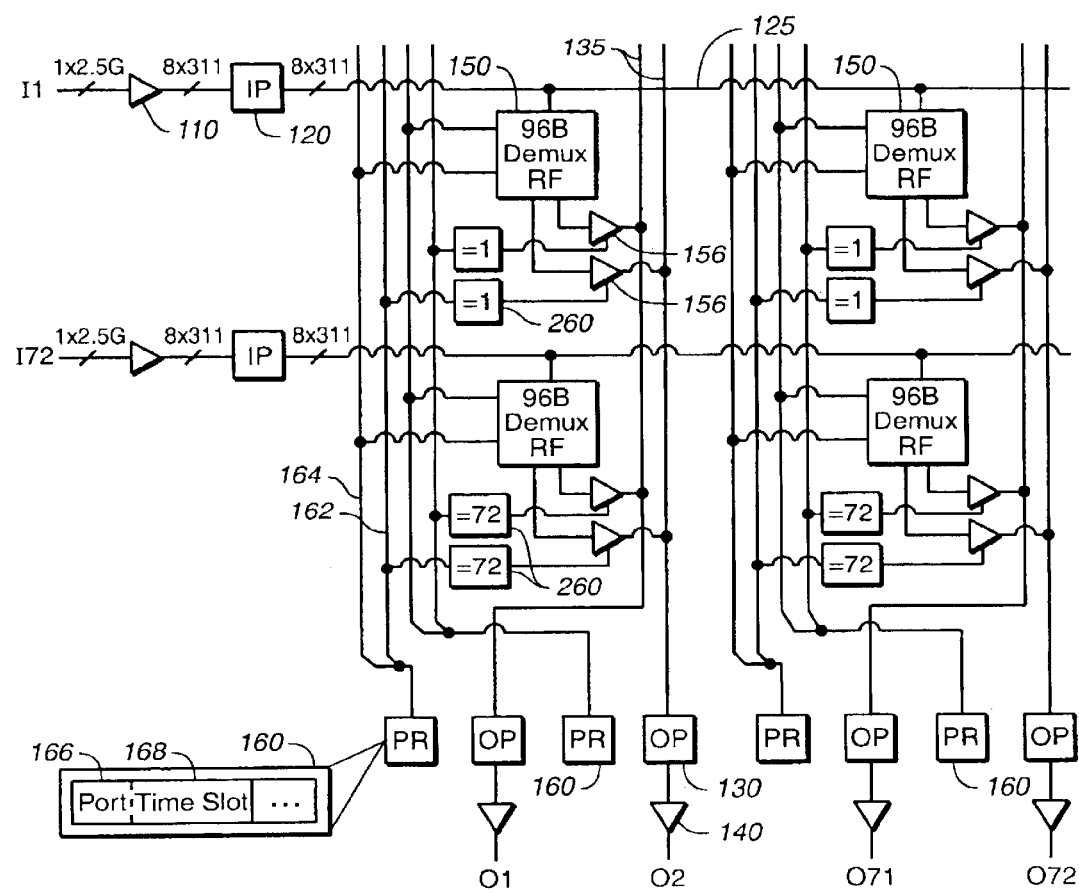
FIG._7

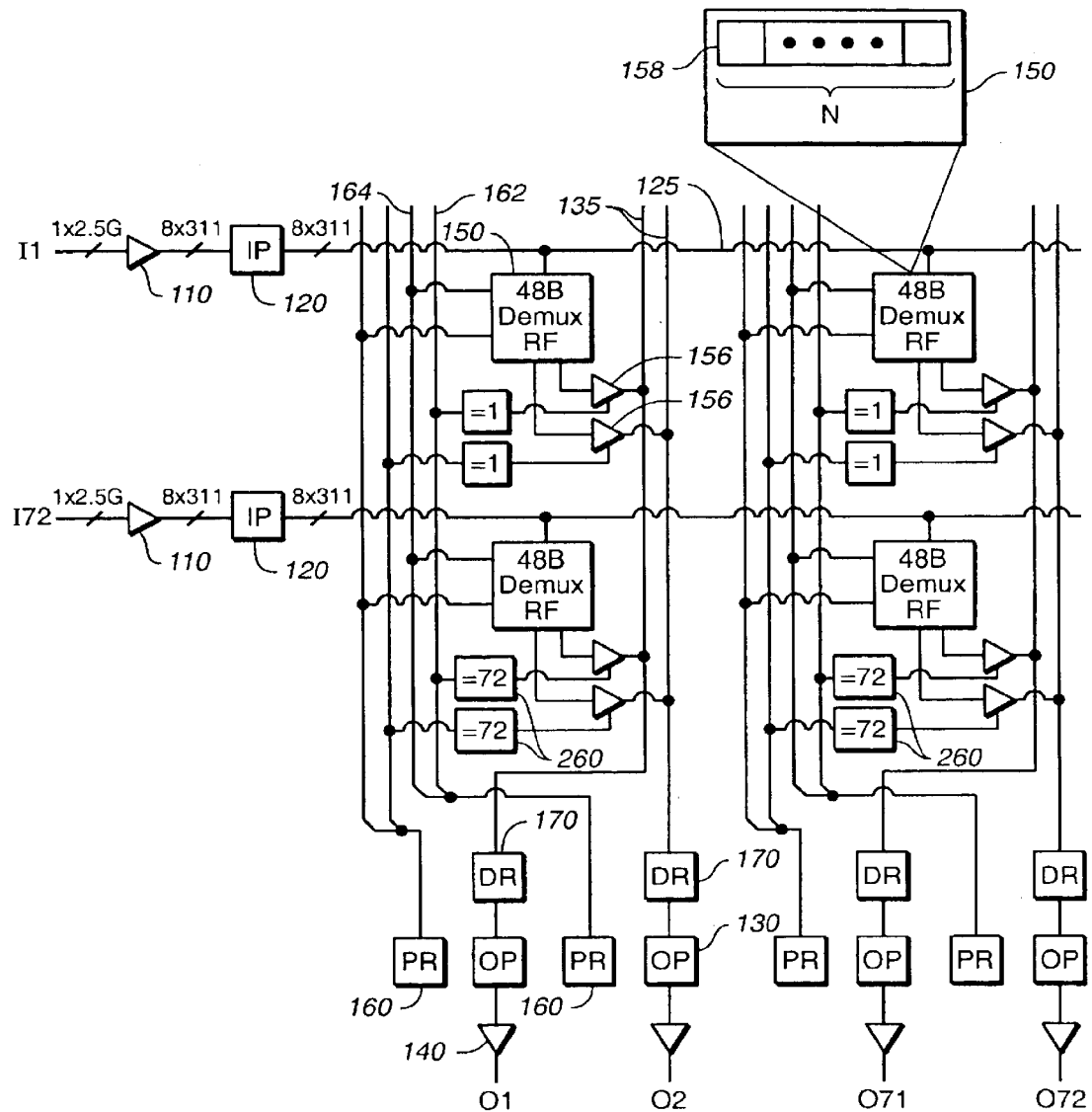
FIG._8

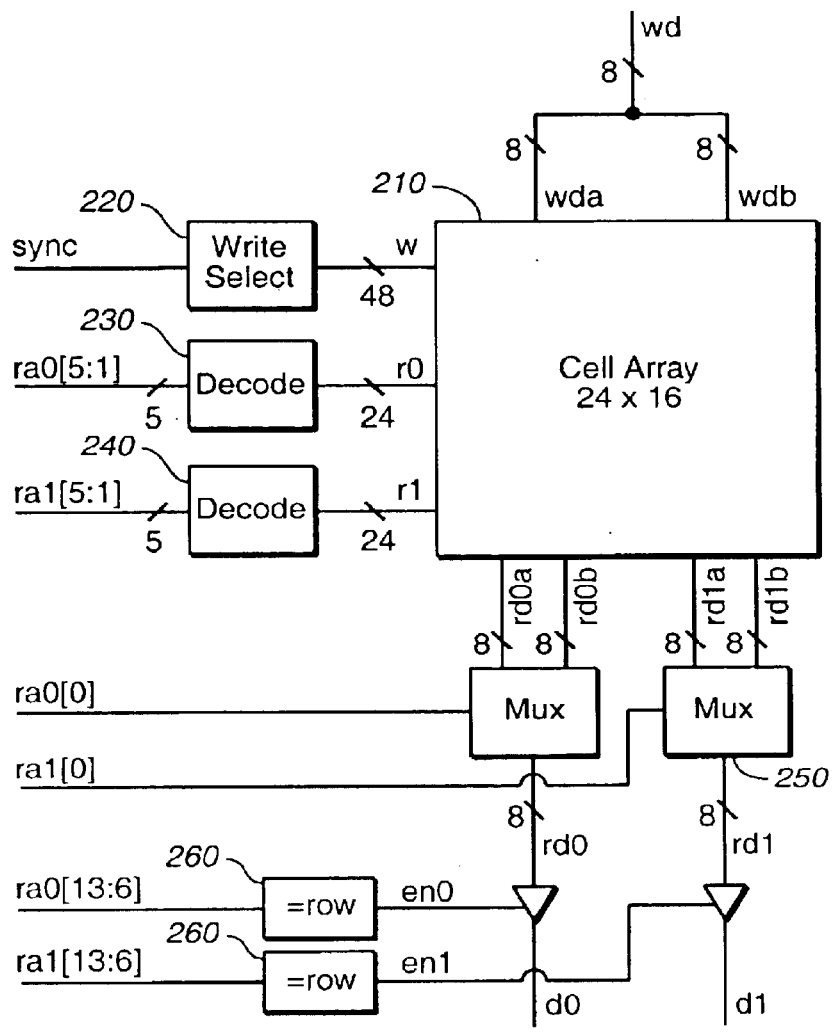
FIG._9
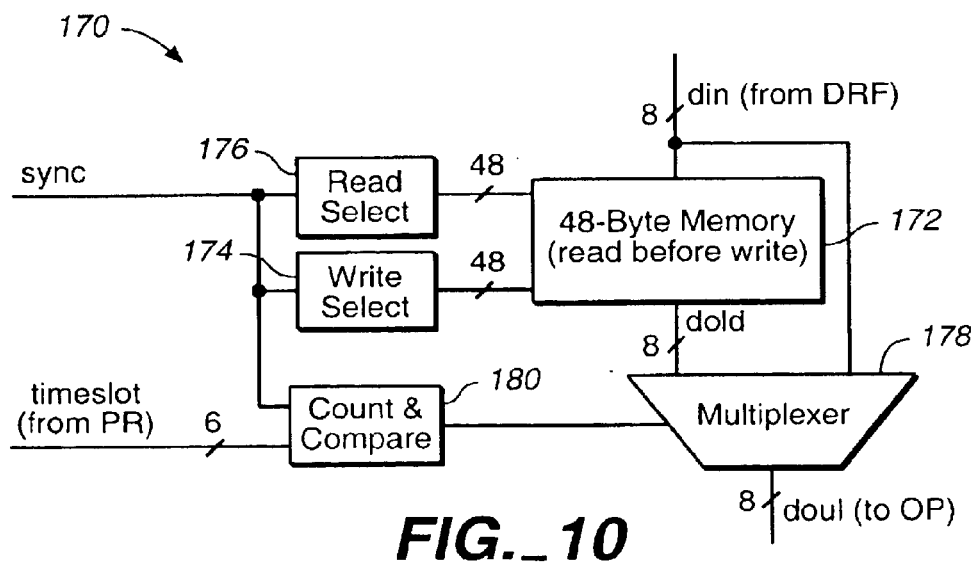
FIG._10

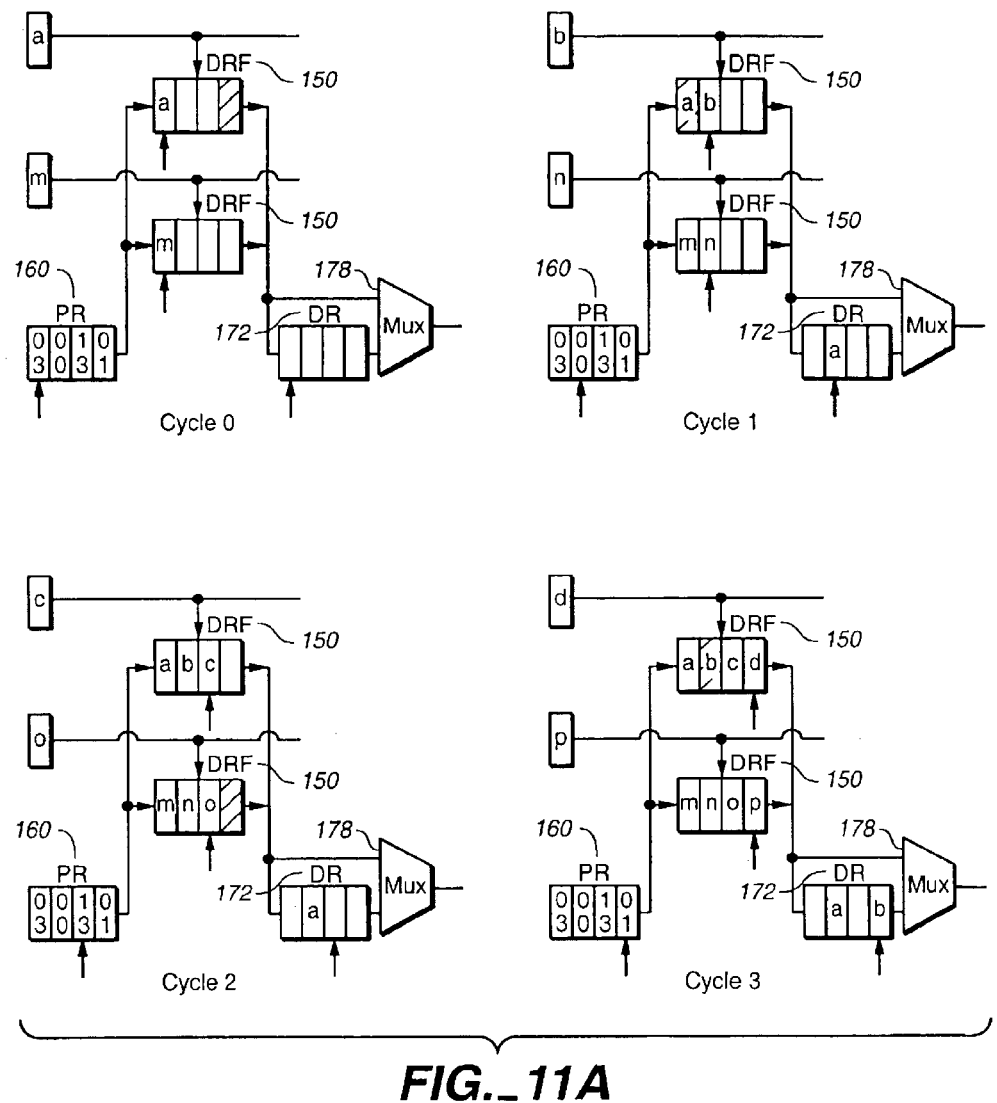
FIG._11A

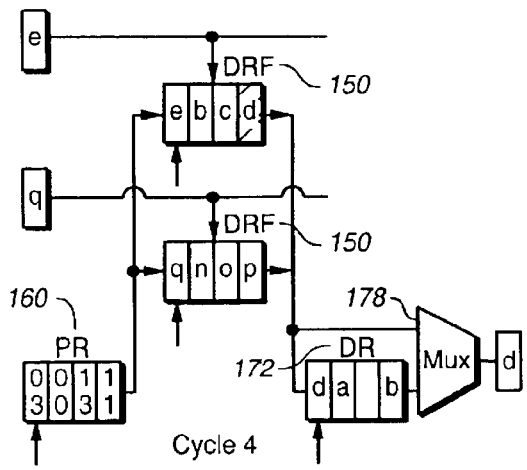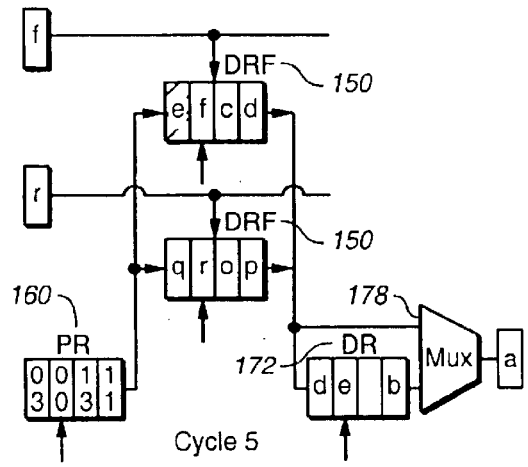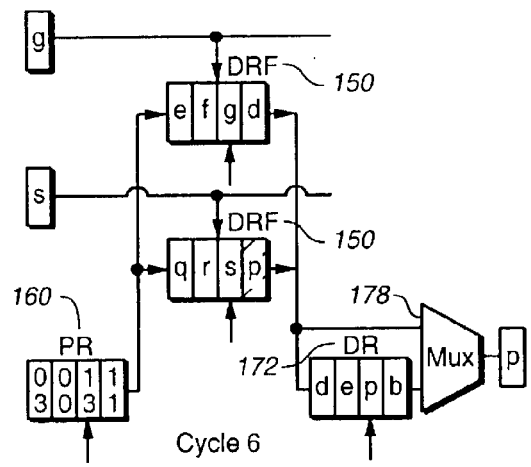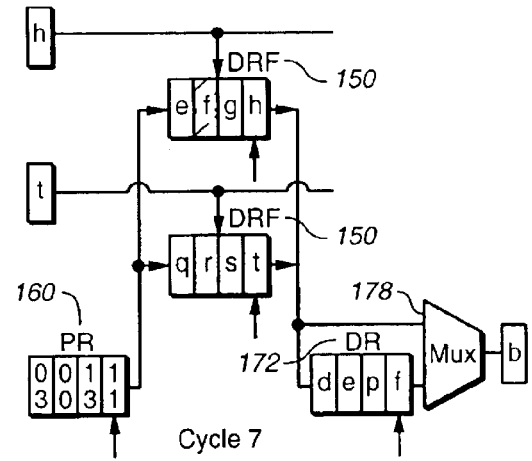
FIG._11B

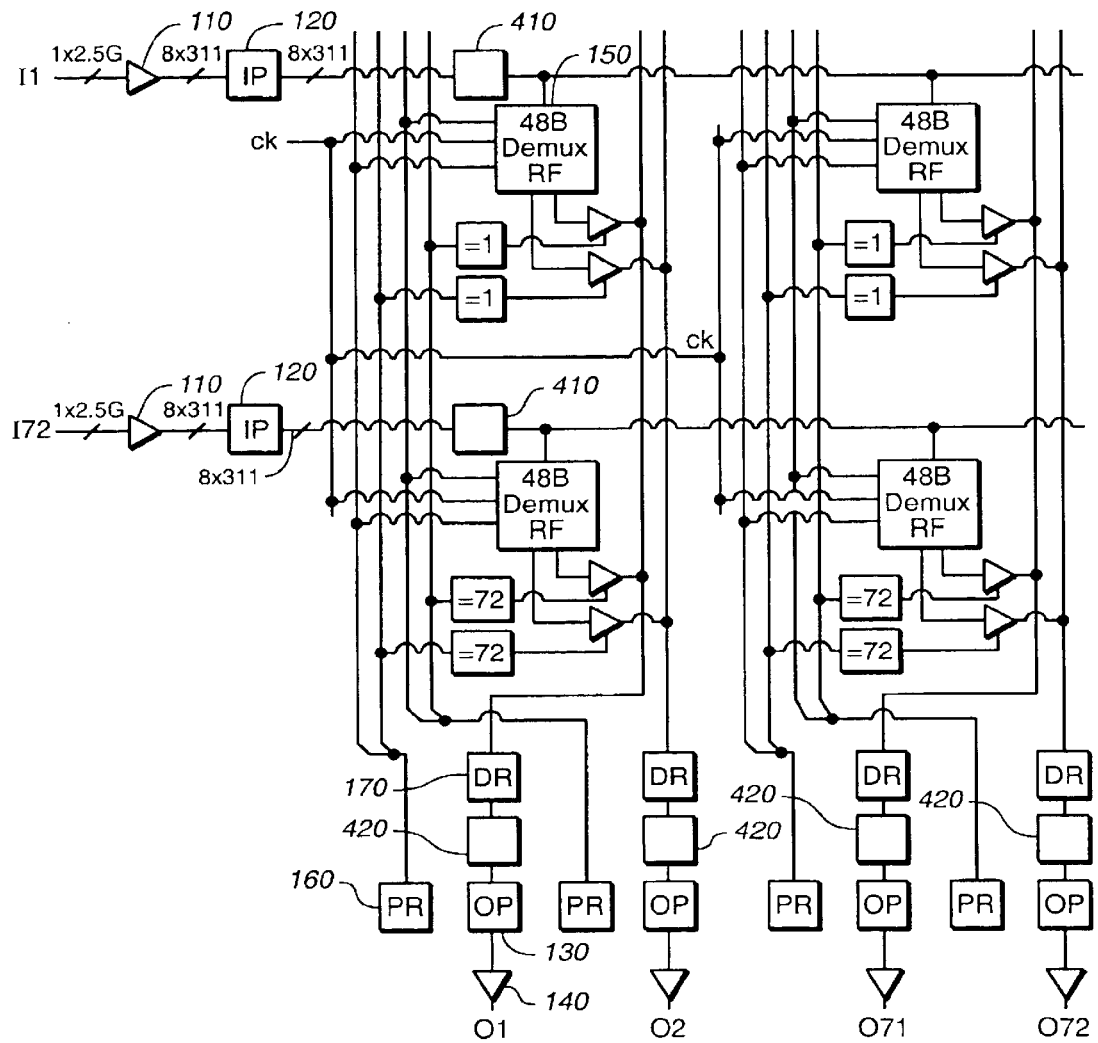
FIG._12A
FIG._12B

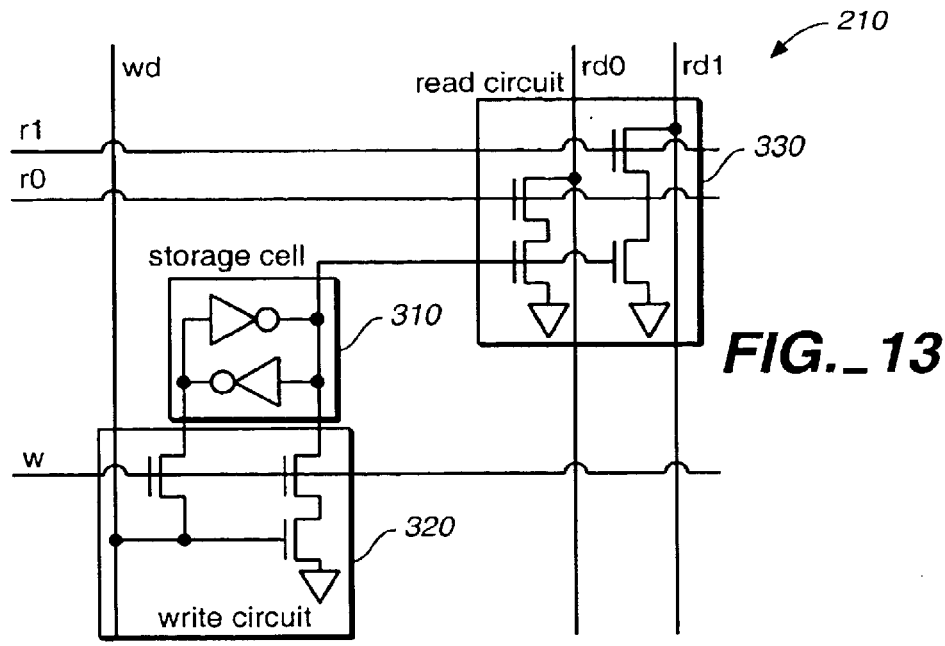
FIG._13
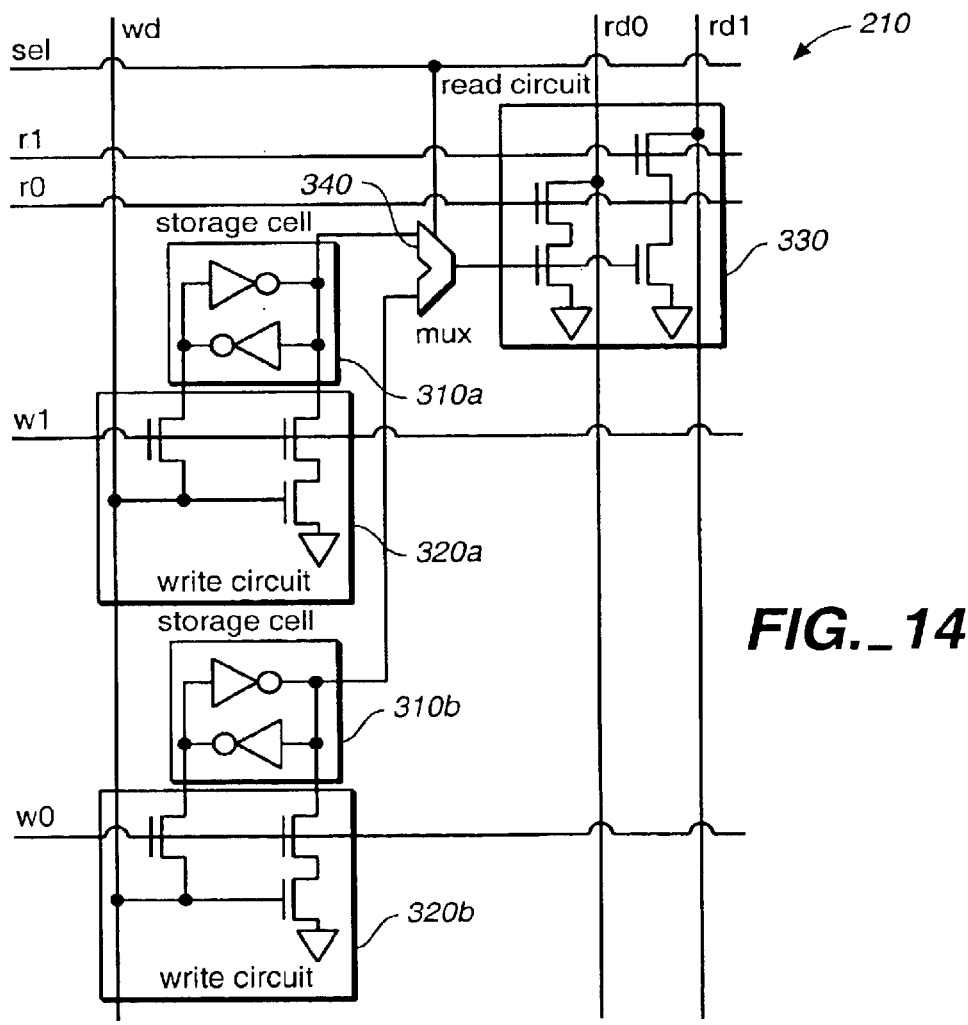
FIG._14

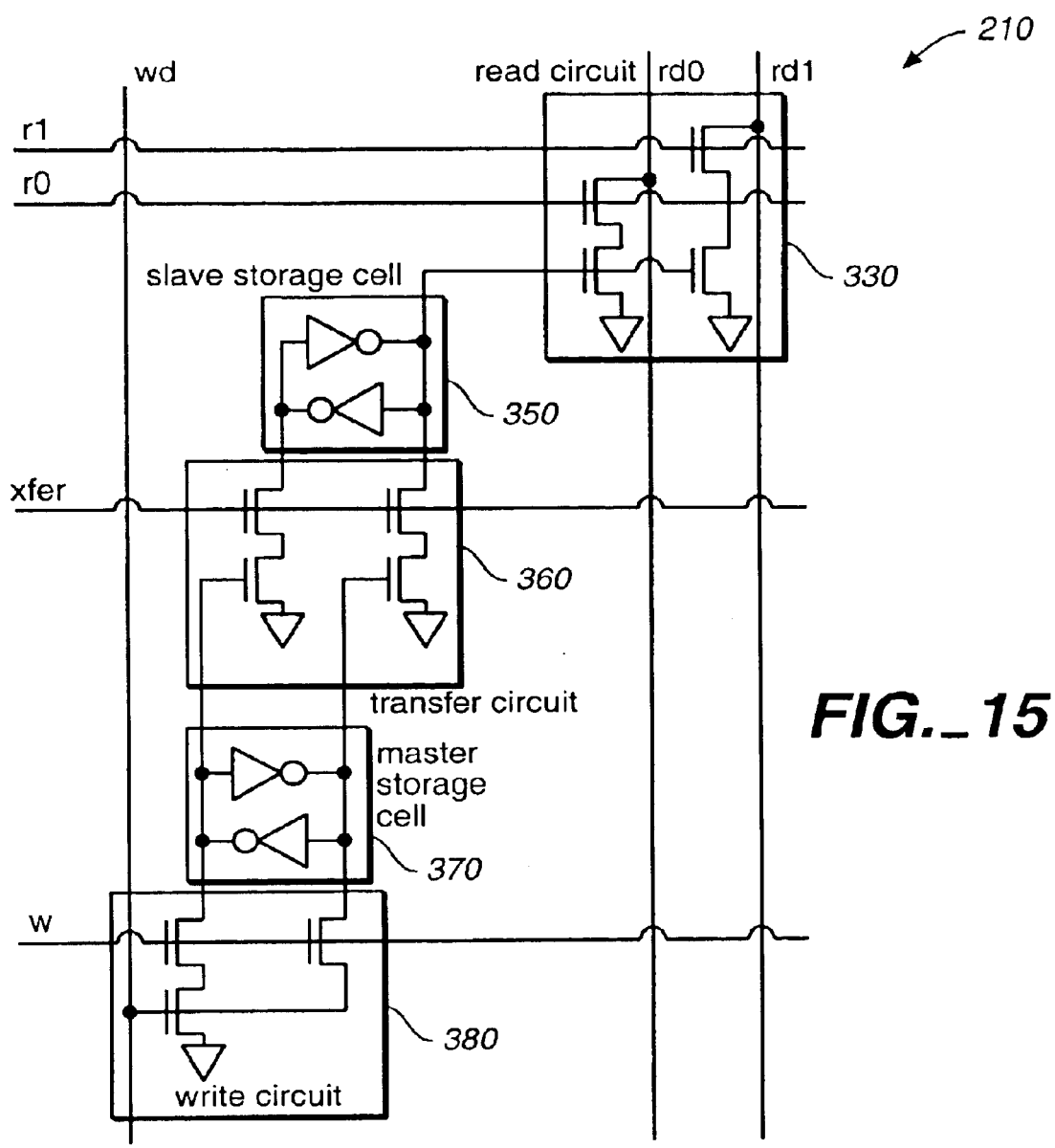
FIG._15

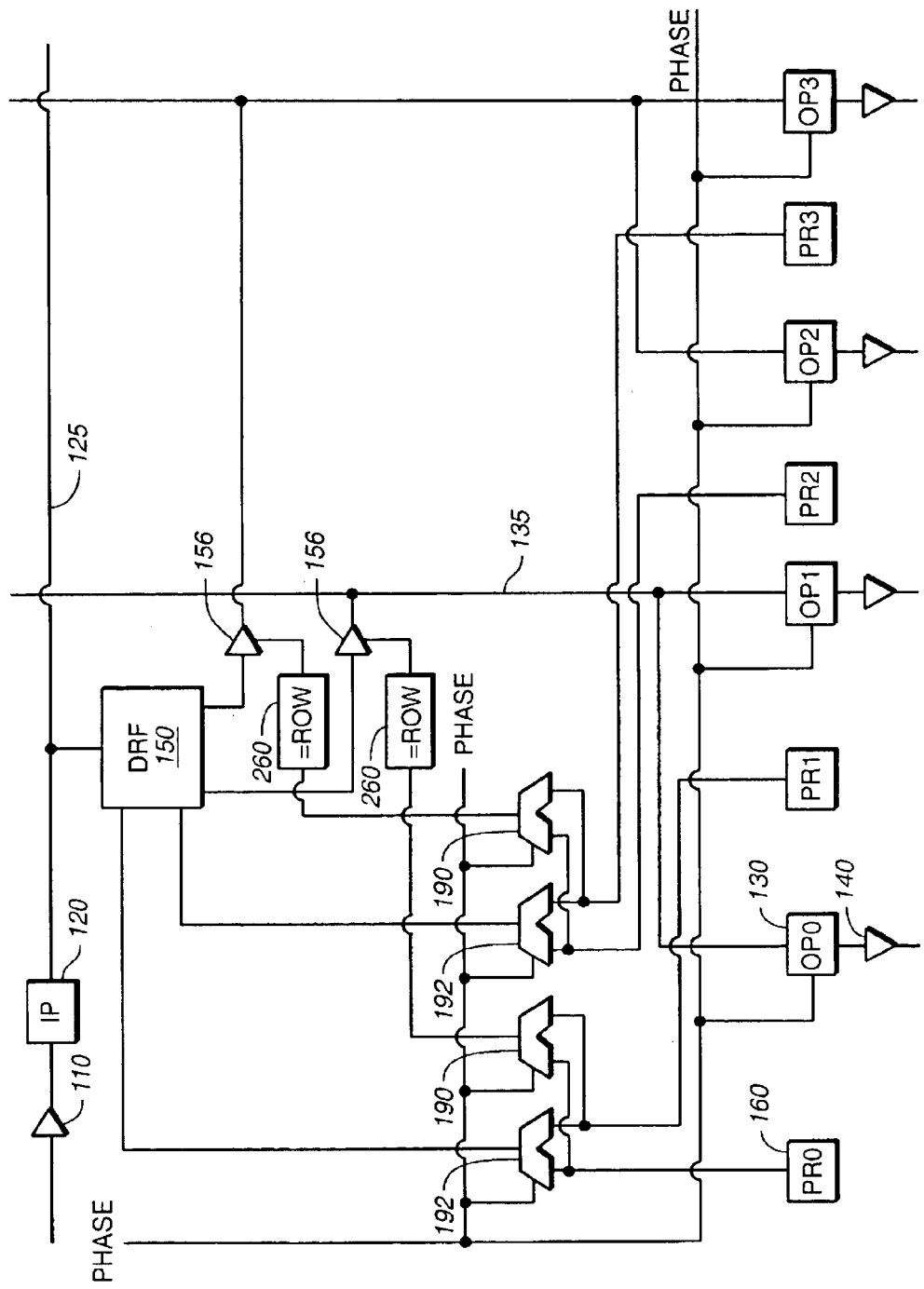
FIG._16

US 6,807,186 B2

ARCHITECTURES FOR A SINGLE-STAGE GROOMING SWITCH

RELATED APPLICATION

This application claims the benefit of U.S. Provisional Application No. 60/287,252, filed on Apr. 27, 2001. The entire teachings of the above application are incorporated herein by reference.

BACKGROUND OF THE INVENTION

Telecommunications channels often carry traffic that is multiplexed from several sources. For example, a 2.488 Gb/s SONET STS-48 channel carries 48 51.84 Mb/s SONET STS-1 channels that are time multiplexed on a byte-by-byte basis. That is, the channel carries bytes 1.1, 2.1, 3.1, ..., 48.1, 1.2, 2.2, 3.2, ..., 48.2, 1.3, 2.3, 2.3, ... where n.m denotes byte m of subchannel n. Details of the SONET format can be found in Ming-Chwan Chow, Understanding SONET/SDH: Standards & Applications, Andan Pub, ISBN 0965044823, 1995 and in ANSI Standard T1.105-1995.

An STS-1 SONET frame is a repeating structure of 810 bytes arranged into 9 rows of 90 columns. The frame structure is transmitted in row-major order. That is, all 90-bytes of row 0 are transmitted, then all 90 bytes of row 1, and so on. At higher multiplexing rates, each byte of the STS-1 frame is replaced by a number of bytes, one from each of several multiplexed sources. For example, at STS-48, 48 bytes, one from each of 48 STS-1 subframes, are transmitted during each column interval. In this case, the order of transmission is to send all 48 subframe bytes for one column before moving on to the next column and to send all of the columns of a row before moving on to the next row.

A digital cross connect is a network element that accepts a number of multiplexed data channels (e.g., 72 STS-48 channels) and generates a number of multiplexed output channels where each output channel carries an arbitrary set of the subchannels from across all of the input ports. For example, one of the STS-48 output channels may contain STS-1 channels from different input channels in a different order than they were originally input.

An example of digital cross connect operation is shown in FIG. 1. The figure shows a cross connect 30 with two input ports and two output ports. Each of these ports contains four timeslots. Input port 1 (the top input port) carries subchannels A, B, C, and D in its four slots and input port 2 (the bottom port) carries subchannels E, F, G, and H in its four timeslots. Each timeslot of each output port can select any timeslot of any input port. For example, output port 1 (top) carries subchannels H, D, F, and A from 2.4, 1.4, 2.2, 1.1 where x.y denotes input port x, timeslot y. Input timeslot must be switched in both space and time. The first timeslot of output port 1, for example, must be switched in time from slot 4 to slot 1 and in space from port 2 to port 1. Also, some timeslots may be duplicated (multicast) and others dropped. Subchannel A, for example, appears in output timeslots 1.4 and 2.2 and subchannel G is dropped, appearing on no output timeslot.

A digital cross connect can be implemented in a straight-forward manner by demultiplexing each input port, switching all of the timeslots of all of the input ports with a space switch, and then multiplexing each output port. This approach is illustrated in FIG. 2. The four timeslots of input port 1 are demultiplexed in demultiplexers (Demux) 32 such that each is carried on a separate line. All of these demultiplexed lines are then switched by a space switch 34 to the appropriate output timeslots. Finally, a set of multiplexers (Mux) 36 multiplexes the timeslots of each output channel onto each output port. This approach is used, for example, in the systems described in U.S. Pat. Nos. 3,735,049 and 4,967,405.

The space-switch architecture for a digital cross connect as shown in FIG. 2 has the advantage that it is conceptually simple and strictly non-blocking for arbitrary unicast and multicast traffic. However, it results in space switches that are too large to be economically used for large cross connects. For example, a digital cross connect with R=72 ports and T=48 timeslots requires a RT×RT (3456×3456) space switch with $R^2T^2$=11,943,936 cross points. Further, this large switch will be operated at a very slow rate. It will only need to switch a new batch of input timeslots after T bytes have been received. Thus, it operates at 1/T the byte rate.

A more economical digital cross connect can be realized using a three-stage time-space-time (T-S-T) switch architecture as illustrated in FIG. 3. Here each input port is input to a time-slot interchanger (TSI) 38. A TSI switches a multiplexed input stream in time by interchanging the positions of the timeslots. To switch time-slot i to time-slot j, for example, slot i is delayed by T+j−i byte times. The multiplexed streams out of the input TSIs are then switched by a R×R space switch 40 that is reconfigured on each timeslot. The outputs of this space switch are switched in time again by a set of output TSIs 42. This T-S-T architecture is employed, for example, by the systems described in U.S. Pat. Nos. 3,736,381 and 3,927,267.

An example of the operation of a T-S-T digital cross connect on the configuration of FIG. 2 is shown in FIG. 4. Here the TSI for input port 1 does not change the positions of its input timeslots. The input TSI for port 2, however, reorders its timeslots from E, F, G, H, to—, F, H, E. The G here is dropped as it is not used by any output ports. The space switch takes the outputs of the two input TSIs and switches them, without changing timeslots, to create the streams A, F, H, D and A, B, C, E. Note that this involves a multicast of timeslot A to both outputs. Finally, the output TSIs reorder these streams to give the output streams H, D, F, A and E, A, B, C.

A three-stage T-S-T digital cross connect is logically equivalent to a 3-stage Clos network with R T×T input stages, T R×R middle stages, and R T×T output stages. To route a configuration of input timeslots to output timeslots on such a switch a middle-stage timeslot must be assigned to each connection. This routing is described in detail in Clos, Charles, "A Study of Non-Blocking Switching Networks", Bell System Technical Journal, March 1953, pp. 406–424, and V. E. Benes, "On Rearrangeable Three-Stage Connecting Networks", The Bell System Technical Journal, vol. XLI, No. 5, September 1962, pp. 1481–1492.

SUMMARY OF THE INVENTION

Digital cross connects, including grooming switches, typically have several disadvantages. First, as illustrated in FIG. 2, the size of fully demultiplexed grooming switches typically increase quadratically with the number of timeslots times the number ports. For example, with the simple DEMUX/MUX architecture, multiplexed input traffic is demultiplexed into its constituent timeslots. For STS-48 traffic, 48 individual byte-wide buses corresponding to 48 timeslots must be input into the switch. Thus, if the port count is 72 ports, 3456 byte-wide buses must be coupled to the inputs of the switch. This results in some switch architectures being physically unrealizable due to size requirements.

With multi-staged switch architectures, as illustrated in FIGS. 3 and 4, the layout size issues are less dramatic. However, high latency, in the order of milliseconds, is associated with reconfiguration of input-output connections. Input-output connections are associations between input timeslots and output timeslots that define data paths through the switch in space and time. Such input-output connections may include input-output permutations and multicast connections. The source of such latency typically stems from complex scheduling computations used by multi-stage cross connects to reconfigure these connections. Such computations typically involve the selection of a middle-stage timeslot to route calls from a particular input timeslot to a particular output timeslot.

Embodiments of the invention provide a switch that switches streams of multiplexed traffic in both time and space domains. Such embodiments implement a distributed demultiplexing architecture for switching between any input timeslot to any output timeslot at a reduced layout size. Furthermore, such embodiments also result in low latencies being associated with reconfiguration of input-output connections on the order of nanoseconds.

Embodiments of the invention include a number of inputs receiving data from external input links and a number of outputs transmitting data to external output links. A distributed demultiplexing switch architecture is implemented that includes intermediate storage units that are coupled to each of the inputs. Each intermediate storage unit stores input data from an input and provides an interface between the input and a subset of the outputs. The subset of outputs may include multiple outputs. Programmable selection storage enables the transfer of selected data from the intermediate storage units to the outputs.

Each intermediate storage unit may include P read ports with R/P intermediate storage units coupled to each input. According to one embodiment, P may be equal to eight (8) ports.

Each intermediate storage unit may include 2N locations, where N is the number of multiplexing intervals in a multiplexing cycle. According to one embodiment N is equal to forty-eight (48) multiplexing intervals. For each intermediate storage unit, a first portion of the 2N locations store a current column from an N STS-1 frame, while a second portion of the 2N locations store a previous column from an N STS-1 frame. The second portion may be addressable as N STS-1 timeslots.

According to a further embodiment, each intermediate storage unit may include N locations, where N is the number of multiplexing intervals within a multiplexing cycle. According to one embodiment N is equal to forty-eight (48) multiplexing intervals. Since reads and writes of such intermediate storage units access the same locations, delay memory is coupled to each output. When the output reads current data from the selected intermediate storage unit, the output reads from the delay memory. When the output reads previous data from the selected intermediate storage unit, the output reads from the selected intermediate storage unit.

The programmable selection storage provides an address signal to select data from an intermediate storage unit and an enable signal to enable output from one of the intermediate storage units that are coupled to different inputs. According to one embodiment, the selection storage includes a number of selection storage units with each being associated with an output.

Further embodiments of the invention provide additional reductions in the size of a switch layout through "multi-pumping." With multi-pumping, each read port of the intermediate storage unit is coupled to multiple outputs, which are enabled successively. According to one embodiment, two or more outputs are coupled to each of the P read ports of an intermediate storage unit. The intermediate storage unit is read from the two or more outputs within a single clock cycle, reducing the number of intermediate storage units per input.

The intermediate storage unit may be a demultiplexing register file (DRF). According to one embodiment, a demultiplexing register file may comprise a cell array including at least N locations for storing data from an input timeslot and a write select coupled to the cell array for enabling a location in the cell array to be written with data from one of the input timeslots. A DRF may further include a number of read decoders coupled to the cell array with each read decoder coupled to a selection storage unit. Each read decoder receives an address signal from the selection storage unit and selects data from a location in the cell array with the address signal for reading to an output. A DRF may further include a comparator that receives an enable signal from the selection storage unit and compares the enable signal to an input port identifier. If the enable signal matches the input port identifier, the comparator enables the selected data from the cell array onto the output.

Embodiments of a cell array for a DRF includes a read circuit, at least one storage cell, and at least one write circuit. The write circuit transfers data from an input into the storage cell, while the read circuit drives the value in the storage cell onto an output. The cell array may include two or more storage cells with the read circuit being shared across the two or more storage cells. The read circuit is driven by a multiplexer, which selects a storage cell from the two or more storage cells having a value to be read onto an output.

Embodiments of the cell array further include a write select circuit and two or more write circuits. The write select circuit enables the two or more write circuits to write in succession. According to a further embodiment, the two or more storage cell may include a master storage cell and a slave storage cell. The at least one write circuit writes data into the master storage cell. The master storage cell, in turn, transfers the data into the slave storage cell. Finally, the data is read from the slave storage cell onto an output by the read circuit.

According to another embodiment of the invention, the configuration of the switch may be reconfigured, such that input-output connections may be modified dynamically without the corruption of frame data. Such embodiments are referred to as hitless configuration switching. Configuration switching may be implemented by rewriting the input-output connections defined within the selection storage units for each output. Embodiments for hitless configuration switching may include each output processor of each output overwriting all of the subframes of a first column of a frame with a fixed value (i.e., 'F6' for SONET frames). This ensures that the beginning of a new input frame is not corrupted due to the reconfiguration of the input-output connections.

According to an alternative embodiment for hitless configuration switching, each of the inputs includes an input processor, while each of the outputs includes an output processor. Each input processor writes columns of an input frame to intermediate storage units coupled to the input. On the output side, each output processor reads a column for an output frame from intermediate storage units or delay memory, which are coupled to the output. To ensure hitless configuration switching, the intermediate storage units may operate at a higher frequency than the frequency of the input processor and the output processor. According to one embodiment, the intermediate storage units may operate at a frequency that is C+1/C times the frequency of the input processors and the output processors, where C is the number of column intervals in a frame. In other words, the intermediate storage units may operate at a frequency such that the intermediate storage units have C+1 columns during a frame period, while the input processors and the output processors having C columns during the same frame period. According to one embodiment, C is equal to 810 columns. No writes are made to the intermediate storage unit during the C+1st column of a frame and no data is output to the output processors during the first column of a frame. According to one embodiment an input FIFO (first-in, first out queue) is coupled between the input processor and an intermediate storage unit and an output FIFO is coupled between the intermediate storage unit and the output processor.

The invention is particularly applicable to grooming switches, which are cross-connect switches that internally aggregate and segregate data for efficient traffic routing. Aggregation is the combining of traffic from different locations onto one facility. Segregation is the separation of traffic. For instance, a SONET grooming switch having 72 STS-48 input and output ports with STS-1 granularity routes any of one of the 72×48=3,456 input STS-1 signals to any one of the 3,456 output STS-1s. Such a grooming switch is non-blocking for unicast traffic, where "blocking" occurs when an active input cannot be connected to an output.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates a digital cross connect known in the prior art.

FIG. 2 illustrates a simple DEMUX/MUX digital cross connect known in the prior art.

FIG. 3 illustrates a three-stage time-space-time (TST) digital cross connect known in the prior art.

FIG. 4 illustrates the operation of the three-stage TST digital cross connect of FIG. 3.

FIG. 5 illustrates a switch having a distributed demultiplexing architecture according to one embodiment.

FIG. 6 illustrates a distributed demultiplexing architecture for a switch according to one embodiment.

FIG. 7 illustrates the operation of the switch of FIG. 6 according to one embodiment.

FIG. 8 illustrates a switch using distributed demultiplexing architecture having further area reductions according to an alternative embodiment.

FIG. 9 illustrates the components of a demultiplexing register file (DRF) according to the embodiment of FIG. 8.

FIG. 10 illustrates a delay memory unit according to one embodiment.

FIGS. 11A and 11B illustrate the exemplary operation of the switch with delay memory according to the alternative embodiment of FIGS. 8 through 10.

FIG. 12A illustrates a method of frame synchronization to obtain hitless configuration switching according to an alternative embodiment.

FIG. 12B illustrates a distributed demultiplexing architecture for a switch operating with mixed frequencies according to one embodiment.

FIG. 13 illustrates the components of the cell array of FIG. 9 according to one embodiment.

FIG. 14 illustrates a cell array of a 96-byte DRF having a reduced area according to one embodiment.

FIG. 15 illustrates a cell array of a 96-byte DRF having a reduced area according to another embodiment.

FIG. 16. illustrates sharing of a DRF among multiple output through multi-pumping according to one embodiment.

DETAILED DESCRIPTION OF THE INVENTION

A description of preferred embodiments of the invention follows.

FIG. 5 illustrates a switch having a distributed demultiplexing architecture according to one embodiment. Such embodiments reduce the area required for switch layout, resulting in the realization of smaller switching devices and/or higher port counts. Further embodiments result in switch reconfiguration of input-output connections at reduced latencies.

The switch 100 provides physical port connections for interconnecting external input links (I1, I2, . . . In) and external output links (O1, O2, . . . On). Embodiments of the invention include 72×72 port switches and 144×144 port switches. However, one skilled in the art will understand that embodiments of the switch may be built with any number of inputs and outputs and that the number of inputs need not be the same as the number of outputs.

The switch 100 performs time and space switching on time-domain multiplexed (TDM) signals, such that each output timeslot of each output port may be connected to any input timeslot of any input port. According to one embodiment, the TDM signals are SONET STS-48 bit-serial streams. An STS-48 (Synchronous Transport Signal-48) bit-serial stream contains data traffic originating from various sources that are multiplexed into 48 STS-1 timeslot channels. However, one skilled in the art will understand that embodiments of the invention may be implemented with an arbitrary degree "N" of multiplexing that may be greater or less than 48.

FIG. 6 illustrates a distributed demultiplexing architecture for a switch according to one embodiment. In particular, FIG. 6 illustrates the architecture for a 72×72 port switch. Each input link I1-I72 is connected to the switch through a physical input port that includes a deserializer 110 and an input processor (IP) 120.

The deserializer 110 converts a 2.488 Gb/s bit-serial stream into an 8-bit wide 311 MHz byte stream. However, one skilled in the art will understand that embodiments of the invention may be practiced with clock frequencies different from 311 MHz. The byte stream is passed into an input processor (IP) 120, which aligns the byte stream. The byte stream is aligned such that the all of the input processors 120 output the same column and subframe during each clock cycle. That is, the byte corresponding to the n-th STS-1 input timeslot in the multiplexed input stream of the n-th column of a SONET frame appears during the n-th clock cycle after a column synchronization pulse across all inputs. The input processor 120 may also perform SONET framing functions, including monitoring and termination of section, line and path overhead, which are well known in the art.

Each output link O1–O72 is connected to the switch 100 through a physical output port that includes an output processor (OP) 130 and a serializer 140. The output processor 130 receives data switched from selected STS-1 timeslots of selected input ports over the vertical byte-wide output bus 135. The output processor 130 performs a series of SONET framing functions with the data, such as insertion of bytes and SONET framing data into STS-48 byte streams. The serializer 140, in turn, converts a 311 MHz byte stream back into a 2.488 Gb/s bit-serial stream.

Embodiments of the distributed demultiplexing switch architecture include a number of intermediate storage units 150, which are coupled to each input via a horizontal byte-wide input bus 125. Each intermediate storage unit 150 stores data received from its associated input and provides an interface between the input and a subset of the outputs.

According to one embodiment, the intermediate storage units 150 are demultiplexing register files (DRFs). Each DRF 150 is accessed through a write port 152 that is coupled to an input bus 125 and P read ports 154 that are each coupled to an output bus 135. In particular embodiments, each DRF 150 includes memory 158 having 2N locations, where N is the number of multiplexing intervals within a multiplexing cycle. For example, a first portion of the 2N locations may store the current column from an N STS-1 frame, while a second portion of the 2N locations may store the previous column from an N STS-1 frame. According to one embodiment, each DRF 150 includes 96-byte memory having 96 locations for storing the current and previous 48-byte columns of an STS-48 frame.

Referring to FIG. 6, a demultiplexing register file (DRF) 150 is placed at every P cross points. Each DRF 150 may have one write port 152 and P=4 read ports 154. Thus, each DRF 150 may be coupled between one input and four outputs. If the number of read ports 154 is increased, the number of DRFs 150 coupled per input row may be reduced. This correlates to a reduction in the overall area in the switch layout, because less area is consumed by the DRFs 150. The number of DRFs 150 per input row may be calculated by the following equation:

$$M = R/P \qquad (1)$$

where M is the number of DRFs per input row, R is the number of outputs and P is the number of read ports per DRF. Thus, for an R=72, P=4 switch, a total of 18 DRFs per row and 1,296 DRFs in total are implemented. However, if the number of read ports per DRF is increased to eight (8) then the number of DRFs per input is reduced in half to nine (9). For an R=144, P=8 switch, 18 DRFs per row and 2,592 DRFs in total are implemented.

FIG. 7 illustrates the operation of the switch of FIG. 6 according to one embodiment. The STS-48 byte stream from each input is written in parallel across the DRFs 150 into 96-byte memory 158. The bytes for every pair of columns in the incoming SONET frames are written in sequence into DRF memory 158. That is, byte 0 of memory 158 is written by the first STS-1 of an even numbered column, byte 1 is written by the second STS-1 of the same column, etc.

The write sequence continues through the even numbered column, until byte 48, which is written by the first STS-1 of the following odd numbered column. Likewise, the write sequence continues through the odd numbered column, until byte 95, which is written by the last STS-1 of the odd numbered column. The process repeats with byte 0 being written by the first STS-1 of the following even numbered column. According to one embodiment, the previous and current columns of a SONET frame is each stored in a 48-byte portion of 96-byte memory 158.

On the output side, each output port builds an STS-48 output data stream from input data transferred from selected STS-1 input timeslots of selected input ports. In particular embodiments, the switch is configured with input-output connections, such that each output timeslot of an output port is associated with an input timeslot of an input port. Thus, on the n-th clock cycle, each output port enables the transfer of data from an input timeslot of an input port, populating the n-th output timeslot. An output port effects the data transfer by selecting one of the DRFs 150 that is connected to the output port's output bus 135 and further selecting one of the bytes of the previous column contained within a 48-byte portion of the 96-byte memory 158 of the selected DRF 150.

In particular embodiments, programmable selection storage (PR) 160 enables the transfer of selected data from the intermediate storage units 150 to the outputs. On every clock cycle, selection storage 160 provides a timeslot selection signal to select data from an intermediate storage unit 150 and a port selection signal to enable an output from one of the intermediate storage units 150, which are coupled to different inputs.

The port selection signal enables a tristate buffer 156 of one of the input DRFs 150, while the address signal selects a particular timeslot within the 96-byte buffer 158 of the enabled DRF 150. In response, the data associated with the selected input timeslot of the selected input port is transmitted over the byte-wide output bus 135 to an output processor 130 where it is inserted into an STS-1 timeslot of an outbound STS-48 byte stream.

According to one embodiment, each output port includes an individual selection storage unit 160, referred to as permutation random access memory (P-RAM). A permutation is an association between input timeslots and output timeslots that define data paths through the switch in space and time. However, embodiments of the invention are not restricted to having input-output connections being permutations. For example, the input-output connections may be multicast connections.

For STS-48 applications, each P-RAM 160 includes 48 locations that are read in sequence, generating port selection and timeslot selection signals on every clock cycle. Each of these locations contains two fields, a port selection field 166 and a timeslot selection field 168. The resulting signals are transmitted from the P-RAM 160 through a port selection bus 162, and a timeslot selection bus 164 to each of the DRFs 150 that are coupled to the output.

According to one embodiment, the port selection field 166 includes $\log_2(R)$ bits (e.g., 8 bits to select among 144 input ports). The port selection field 166 selects one of the R DRF buffers by enabling a tri-state buffer 156, which drives the output of the memory 158 onto the output bus 135 when the port selection field 166 matches the row address.

In particular embodiments, the port selection bus 162 is coupled to a number of comparators 260 with each corresponding to an input row. The comparator 260 compares the port selection signal from the P-RAM 160 to the current input row number and enables the tri-state buffer 156 allowing data read from the DRF 150 onto the output line 135 if they match.

According to one embodiment, the timeslot selection field 168 includes $\log_2(N)$ bits (e.g., 6 bits to select among 48 timeslots) and is applied as a read address for a byte in memory 158 that stores the data from a particular input timeslot. The combination of the two field values 166, 168 defines a particular input timeslot on a particular input port, whose data is transferred over the associated output timeslot. Thus, by placing the proper values into the two fields of each of the 48 locations in a given selection storage unit 160, each output timeslot can be connected to any input timeslot of any input port.

To avoid inconsistencies that may arise when reading and writing data at the same time, the output ports read an odd column, while an input port is writing an even column, and vice versa. Thus, the frame timing of the output ports is always one column behind that of the input ports. According to one embodiment, the high bit of the timeslot read address for each port of each DRF memory 158 selects between the odd and even columns and is the same for all DRFs.

One skilled in the art will understand that it may be advantageous to provide multiple versions of the 48 locations in each of the R selection storage units 160. For example, there may be four copies of the 48 locations. The locations are duplicated such that one set can be updated while the other is in use. The locations are duplicated again such that separate working protection input timeslots may be specified for each output timeslot of each output port.

Furthermore, one skilled in the art will also understand that there are many possible encodings of the port and timeslot selection fields 166, 168. According to one embodiment, these fields are stored using a binary encoding but predecoded into a higher radix form before driving the array of DRFs. Each higher radix digit is represented by a 'one-hot' binary vector. For example, the one-of-144 port selection field is decoded into a one-of-nine field and two one-of-four fields, while the one-of-48 timeslot selection field is decoded into a one-of-eight field and a one-of-six field. This encoding reduces power in the array.

An advantage of this system is that the P-RAM 160 is directly selecting the input port and the input timeslot that appear on the output port and the output timeslot. Such embodiments result in the ease of reconfiguration of input-output connections. Reconfiguration may be implemented by rewriting the P-RAM 160 associated with an output with the reconfigured input-output connection field values 166, 168 for each output timeslot.

The global wiring complexity of this architecture is small. There are R 8-bit input buses 125 that must be fanned out to all R/P DRFs 150 in an input. Similarly, there are 8-bit output buses 135 that connect a column of R DRFs 150. An address must also be distributed vertically from a single P-RAM 160 associated with each output processor 117 to the DRFs in its column.

The major area and power cost of this architecture is the DRFs 150. The design requires $R^2/P$ DRFs (e.g., 1296 if R=72 and P=4), each with 768 bits (96×8) of storage and P+1 ports. The table below shows the number of DRFs (N) total number of bits "b" and an estimated area "a" for R=72 and R=144 port networks with P=2, 4, and 8. The area estimates assume that a P+1 port register bit requires an area 4+P+1 metal tracks wide by 5+P+1 metal tracks wide. The column labeled "a" gives the area in metal tracks. The last column converts this to square millimeters using a track pitch of 0.5 microns ($\mu$m) for 0.13 micron ($\mu$m) technology. This calculation does not factor into account peripheral circuitry; thus, these area values may double with such small register files.

| R | P | M | N | b | a/b | a | a in mm$^2$ |
|---|---|---|---|---|---|---|---|
| 72 | 2 | 36 | 2592 | 1.99e+6 | 56 | 1.11e+8 | 27.9 |
| 72 | 4 | 18 | 1296 | 9.95e+5 | 90 | 8.96e+7 | 22.4 |
| 72 | 8 | 9 | 648 | 4.98e+5 | 182 | 9.06e+7 | 22.6 |
| 144 | 2 | 72 | 10368 | 7.96e+6 | 56 | 4.46e+8 | 111.5 |
| 144 | 4 | 36 | 5184 | 3.98e+6 | 90 | 3.58e+8 | 89.6 |
| 144 | 8 | 18 | 2592 | 1.99e+6 | 182 | 3.62e+8 | 90.6 |

Even if the area "a" is doubled to account for peripheral circuitry and uncounted logic, the design is feasible for an R=72 port grooming switch. With P=4, the roughly 1 megabit (Mb) of DRF require is 22.4 mm$^2$. Doubling this to account for overhead gives a switch core of about 7 mm on the side, which is competitive with current designs. The R=144 port switch is on the edge of feasibility, however, if the area estimate "a" is doubled, the switch core would require an area over 13 mm per side.

FIG. 8 illustrates a switch using distributed demultiplexing architecture having further area reductions according to an alternative embodiment. In this embodiment, each intermediate storage unit includes N locations, where N is the number of multiplexing intervals in a multiplexing cycle. For STS-48 applications, there are N=48 locations. Thus, as compared with the embodiments of FIGS. 6 and 7, DRF memory 158 is reduced to 48-bytes such that even and odd columns are written to the same locations.

Since there is only a single column of memory 158 in this embodiment in each DRF, the output ports are reading the same memory locations that the input port is writing. In particular, when the output port reads ahead of the input port (i.e., output timeslot j reads input timeslot i and i>j), it reads the value from the previous column (column c−1). When the output port reads behind the input port (i.e., output timeslot j reads input timeslot i and i<=j), it reads the value from the current column (column c).

To correct this scrambling of columns, a delay memory unit (DR) 170 is added that stores the last 48 bytes read from the DRFs 150 in each column. In particular, the delay memory unit 170 provides a one column delay for those bytes read from the current column while passing bytes read from the last column directly. Thus all bytes output from the DR 170 are from the previous column (c−1). This alternative organization reduces the amount of storage needed in the DRF array by a factor of two at the expense of adding the delay memory units 170 and some complexity to deal with configuration switching as described with reference to FIG. 12.

FIG. 9 illustrates the components of a demultiplexing register file (DRF) according to the embodiment of FIG. 8. Although the DRF described is a 48-byte DRF with P=2 output ports, the details are similar for (i) DRFs having different size memory (e.g., 96-byte DRF), (ii) DRFs with more than 2 output ports, and (iii) DRFs having different aspect ratio cell arrays.

According to one embodiment, the 48-byte memory is realized as 24 row by 16 column cell array 210 where each row contains two bytes in an interleaved manner (interleaving not shown for clarity). With respect to writing to a DRF, input data "wd" is supplied to both bytes, while separate write select lines enable the data "wd" to be written into just one byte per cycle. The write enables, "w," are generated by a write select block 220 that accepts a synchronization pulse, "sync," at the start of each column and sequences through the 48 write enables "w" during the subsequent 48 cycles. This block 220 can be realized, for example, using a shift register.

With respect to reading from a DRF, for each output port, the upper five bits of each timeslot read address, "rax[5:1]," are input to a read decoder 230, 240 that selects one of the 24 rows of the memory 210. The low order bit of each read address "rax[0]" selects the byte within the row using a byte-wide column multiplexer 250 per output port.

Finally, a comparator 260 compares the port selection field 166 from the P-RAM 160 for each output port x (rax[13:6]) to the current row number and enables the data read from the DRF 150 onto the output line (dx). This enable signal can also be used to inhibit the read decoder when this row is not selected to save power.

FIG. 10 illustrates a delay memory unit according to one embodiment. A delay memory unit 170 may include a 48-byte memory 172 with one read port, "din," and one write port, "dold," stores the last 48-bytes read from the DRFs for a particular output. The memory 172 is of the read-before-write type in that when the same location is accessed for read and write during the same cycle, the old value stored in the memory is read first and then the new value is written.

Each cycle, the data read from the DRFs is stored in sequence at a location determined by the write select logic 174. This logic is reset to the first location at the beginning of each column by the column sync pulse, "sync". Similarly values are read from the delay memory 172 in sequence by the read select logic 176. By reading and writing the same location in this manner, the delay memory 172 acts as a column delay, reading the value stored from the last column (i.e., N=48 byte times ago) and writing the value from the current column.

A multiplexer 178 selects between the current data read from the DRF, "din," and the old data that has been read from the delay memory, "dold". The multiplexer 178 is controlled by a count and compare circuit 180 This circuit keeps count of the current timeslot, which is being written in the DRF 150 by the input processor (IP) 120, and compares this value with the timeslot selection field 168 from the PR 160. If the timeslot selection field is greater than the current count, the value from the DRF 150 is from the last column (column c-1) and the multiplexer 178 selects "din". Otherwise, the value from the DRF 150 is from the current column (column c) and the multiplexer 178 selects "dold," which is from column (c-1).

FIGS. 11A and 11B illustrate an example of the operation of the switch with delay memory according to the alternative embodiment of FIGS. 8 through 10. In particular, two columns of operation for one output slice of a switch with N=4 timeslots per column and R=2 input ports is illustrated. The P-RAM 160 selects port 0 slot 3 on for output slot 0, port 0 slot 0 for output slot 1, port 1 slot 3 for output slot 2, and port 0 slot 1 for output slot 3. The values initially in the DRFs 150 from column (c-1) are shown as blanks.

During each cycle, the value being read from the selected DRF 150 is shown with cross hatching and the selected input of the multiplexer 178 is shown as a bold line. During cycles 0, 1, 2, and 3, input ports 0 and 1 write "a, b, c, d" and "m,n,o,p" respectively into the two DRFs 150.

During cycles 0 and 2, the output port reads ahead of the input port and hence reads 'blank' values from column (c-1) into the DR 172. During these cycles the multiplexer 178 selects the upper input, reading directly from the DRF 150.

During cycles 1 and 3, the output port reads behind the input port, reading values 'a' and 'b', which are stored in the DR 172. During these cycles, the multiplexer 178 selects the lower input, reading the old value from the DR 172, which is also from column (c-1).

Operation proceeds in a similar manner in cycles 4, 5, 6, and 7 as shown in FIG. 11B. The output port reads values 'd' and 'p' directly from the DRFs 150 in cycles 4 and 6 and values 'a' and 'b' from the DR 172 in cycles 5 and 7. The net result is that the output values "d,a,p,b" are all from the same column, which is column 0 in this example.

While the embodiments illustrated in FIGS. 8 through 11 have the advantage of greatly reducing the total amount of memory needed to realize the switch, it complicates handling of configuration changes. A configuration change occurs when one version of the permutation memory (PR) 160 which is associated with a particular output port, is swapped for another, resulting in different input-output connections. To perform 'hitless' switching, the configuration switch must occur on a frame boundary. Such frame synchronized switching is referred to as "hitless" because it does not hit or corrupt the contents of any frames. For example, with hitless reconfiguration, the old configuration is used on the last column of one frame (column 809), while the new configuration is used on the first column of the new frame (column 0).

With the embodiment illustrated in FIGS. 8 through 11, however, some of the values read from the DRF 150 during column 0 are from column 0 (the new frame) and some are from column 809 (the old frame). Moreover, if in any timeslot "t" the configuration switches from reading behind the write pointer to reading ahead of the write pointer, the DRF read port 154 needs to do two reads in the same cycle since column 809 of the old configuration and column 0 of the new configuration both need to be read during timeslot "t" of column 0. In this context, column 0 refers to input timing. The output port is one column behind the input port and hence is processing column 809 while the input port is processing column 0.

According to one embodiment, this configuration switching issue is addressed by taking advantage of the fact that the first column of a SONET frame contains the fixed value hexadecimal 'F6' in every byte which represents the SONET framing character 'A1'. Thus, when handling pure SONET frames, it is acceptable to garble the first byte of the frame and replace it with its known value of 'F6'. In this case, the configuration may be switched at the start of column 1 rather than at the start of column 0. This allows direct reads of column 809 data during column 0 such that the last column of the old frame is not corrupted. Any reads from the DR 170 during column 1 will be incorrect. However, they may be replaced by the fixed value of 'F6' to restore them to their proper state. According to one embodiment, the output processor (OP) 130 performs the function of overwriting all of the subframes of the first column of a frame with a fixed value (i.e., 'F6').

FIG. 12A illustrates a method of frame synchronization to obtain hitless configuration switching according to an alternative embodiment. As shown, hitless configuration switching may be performed by operating the DRFs 150 at a frequency higher than the frequency of the input processors 120 and the output processors 130 such that the value of the first byte of the frame may be preserved. In particular embodiments, DRF cell arrays 210 and the 'internal' side of the input processor (IP) 120 and output processor (OP) 130 may be operated at a clock rate that is slightly faster than the external side of the IP 120 and OP 130. For a SONET frame where there are normally 810 columns per frame, the cell array 210 is operated at a clock rate that is 811/810 times as fast as the external side of the IP 120 and OP 130, such that the cell array has 811 column intervals per frame.

As illustrated in FIG. 12B, operating the core at a different frequency than the input and output processors 120, 130 also requires that an input FIFO (first-in, first-out queue) 410 be added between the input processor (IP) 120 and the core of the switch. Likewise, an output FIFO 420 is added between the delay memory unit 170 and the output processor (OP) 130.

Referring to back FIG. 12A, for a switch that operates on SONET STS-48 streams one byte at a time, there are 48 cycles per column. As illustrated in rows "e" and "f", the input processor (IP) 120 and output processor (OP) 130 cycle through 810 columns with the OP 130 lagging one column behind the IP 120. In particular embodiments, the IP 120 must accumulate at least N bytes (48 for the STS-48 applications) in the input FIFO 410 before the start of core column 0 so that the input processor 120 does not underrun the input FIFO 410 when it completes 810 columns one column time before the end of the frame. On the output side, the output FIFO 420 grows to at least 48 bytes in length at the end of a frame and is then drained of 48 bytes during OP column 809 when no writes are being performed into the output FIFO.

As illustrated in row "a", the cell array 210 or 'core' operates faster than IPs 120 and OPs 130 cycling through 811 columns in the same period of time.

As illustrated in row "b", each input processor 120 writes its row of DRFs 150 with input data as described above during the first 810 of these columns. During the last column (c=810) no writes are performed and the contents of the DRF remain unchanged (i.e., "nop" is an acronym for "no operation").

As illustrated in row "c," each output processor (OP) 130 reads its column of DRFs 150 on each of the 811 cycles. During the first column period, it reads values from column 809 when it reads ahead of the write pointer and from column 0 when it reads behind the write pointer. Hence this column period is labeled 809/0. The DRF reads continue in this way until the 811$^{th}$ period. Because there are no writes to the DRF this cycle, these reads all read column 809.

Using the delay memory unit 170, as illustrated in row "d," the older of the two columns listed under row "c" is always written to the output FIFO 420, except during the first of the 811 columns when no values are written to the output FIFO 420.

When configurations are switched, a different permutation memory is selected by changing a high-order address bit of the PR 160 at the end of the frame after core column 810. During the first cycle after the configuration switch, the DRFs are read but no data is output to the output FIFO 420. This allows the delay memory 172 to be primed with data corresponding to the new configuration, such that reads from the delay memory 172 during the second column of the new configuration will be correct.

Operating the grooming switch as shown in FIG. 12A requires that a core clock "ck" with frequency 811/810 times that of the input processor (IP) 120 and output processor (OP) 130 frequency be generated, as illustrated in FIG. 12B. This may be accomplished using phase-locked loop techniques, using clock interpolation, or other such clock multiplication techniques well known to those skilled in the art.

FIG. 13 illustrates the components of the cell array of FIG. 9 according to one embodiment. The multiported memory cell 210 has three main components. A pair of cross coupled inverters forms a storage cell 310 that holds a binary 1 or 0 once written. A write circuit 320 transfers data from a write data line, "wd," into the storage cell 310 when a write select, "w" is asserted. Finally, a read circuit 330 drives the value in the storage cell 310 onto one of the output ports, "rdx" when the corresponding read select line, "rx" is asserted. Although a read circuit 330 with two ports is shown, an eight-port read circuit with eight read select lines and eight read data lines is preferred.

Furthermore, an NMOS open-drain read circuit is shown and requires the read data lines to be precharged before the read cycle starts. Alternatively a read data line with a resistive load could be employed.

One skilled in the art will understand that memories can be implemented with different types of storage cells (e.g., dynamic cells), different write circuits, and different read circuits. In particular, while this discussion describes a cell with single-ended read and write ports, one skilled in the art will understand that the cell could be realized with differential read and write ports or with a mix of differential and single-ended ports. The organization described here applies to memory cells with different circuit implementations.

FIGS. 14 and 15 show two embodiments of the DRF in which a 96-byte DRF is realized in a much smaller area than would be normally be required by sharing a read circuit across a pair of cells. This sharing is possible because the output processor (OP) 130 only reads cells of an even (odd) column while the input processor (IP) 120 writes cells of an odd (even) column. Thus, a cell of the odd column of the DRF 150 may share a read circuit with the corresponding cell of the even column of the DRF 150 since the OP 130 never needs to read both at the same time. In an eight-port configuration, the read circuit dominates cell area making the savings of this sharing significant.

FIG. 14 illustrates a cell array of a 96-byte DRF having a reduced area according to one embodiment. In this embodiment, the write circuit and storage cell are duplicated (i.e., 310a, 310b and 320a, 320b) with one for the odd column, written by "w0"t and one for the even column written by "w1". A write select circuit 220, as in FIG. 12, with 2N outputs (e.g., 96 outputs) generates these separate writes for odd and even columns. A multiplexer 340 selects between the odd and even column cells to drive the read circuit 330. The multiplexer 340 is controlled by an odd/even select line, "sel," that is generated by the write select circuit 220, such that the multiplexer selects the odd cells when the even cells are being written and vice versa. According to one embodiment, the read circuit 330 is identical to that of FIG. 13.

FIG. 15 illustrates a cell array of a 96-byte DRF having a reduced area according to another embodiment. In this embodiment, a storage cell in which a single read circuit is shared across two bits of storage according to an alternative embodiment. In this cell, only the lower storage cell 370, referred to as the master storage cell, may be directly written from the write data line when the write select line (w) is asserted. There are N such select lines in each DRF, as in FIG. 12. Data from the master storage cell 370 is transferred to the slave storage cell 350 when the transfer line, "xfer," is asserted. Data from the slave storage cell 350 is read onto the read data lines as in the circuit of FIG. 13.

In operation, the input units write the master storage cells 370 of all 48 locations with data from an even column. All 48 locations are then copied into the slave cells 350 by asserting the transfer line. After this copy is performed the input units then write all 48 master locations with data from an odd column. While this odd write is taking place, the output units are reading the even data from the slave cells 350. At the end of this SONET column, the xfer line is again asserted and the odd data are transferred to the slave cells 350.

To sequence the reading, writing, and transferring of data in the circuit of FIG. 14, a two-phase timing design may be implemented where the write select lines and read select lines are asserted only on phase zero (clock high) and the xfer line and read data precharge lines are asserted only on phase one (clock low). To avoid corrupting odd (even) data with the first even (odd) write, the "xfer" line should go low well before the first write select line of a column goes high.

FIG. 16 illustrates sharing of a DRF among multiple output through multi-pumping according to one embodiment. Such embodiments may further reduce the area of the switch layout or increase the port density of the switch. Multi-pumping involves each DRF 110 being read multiple times per 311 MHZ clock cycle, rather than once every clock cycle. Embodiments of multi-pumping allow two or more P-RAM 160 and output processors 130 to be coupled to each read port 132 of a DRF 150, reducing the number of DRFs 150 per input row.

Multi-pumping results from 0.13 micron CMOS technology, which provides gate delays in the order of 50 picoseconds. Since the period of a 311 MHZ clock cycle is approximately 3.2 nanoseconds, the RAM buffers within the DRFs 150 are fast enough to be read in approximately one nanosecond. Therefore, the last column buffer 134 may be read at least two (2) or three (3) times in a 311 MHZ clock cycle, allowing two or three output processors 130 to be coupled to a single read port 132.

Referring to FIG. 16, the two (2) read ports of a DRF 150 may be treated as a 4 or 6 port DRF if data is read at 622 MHz or 933 MHz, respectively. According to one embodiment, a pair of output processors (OP) 130 are coupled to each read port 154 via a vertical output bus 135. For example, output processors OP0 and OP1 are coupled to one of the two read ports. Address and enable buses extend from an associated pair of P-RAM 160 (e.g., PR0 and PR1) into two separate multiplexers 190 and 192. Multiplexer 190 multiplexes the enable buses from P-RAM PR0 and PR1, which carry port selection signals. Likewise, multiplexer 192 multiplexes the address buses from P-RAM PR0 and PR1, which carry timeslot selection signals.

For each multiplexer 190 and 192, a phase signal, PHASE, alternates between two inputs, such that the a read port of the DRF is read alternating between output processors OP0 and OP1 within a single clock cycle of the switch (e.g. 311 MHz). The phase signal may be driven at a multiple of the switch clock cycle, such as 622 MHz and 933 MHz.

In operation, a first P-RAM PR0 selects data to be read to the output processor OP0 when the clock goes high and the second P-RAM PR1 performing the same function when the clock goes low. Thus, data may be transferred to two separate output processors OP0 and OP1 within the same 311 MHZ clock cycle. Alternatively, the permutation fields of two outputs may be interleaved in a P-RAM, which is clocked at the 622 MHz rate.

With multiple pumping, multiple output processors may be coupled to a single read port of a DRF, reducing the number of DRFs per input row in half. For example, where a 72 output switch having DRFs with four multiplexing ports, 18 DRFs are required per input row. However with double pumping the number of DRFs may be reduced from 18 to 9. Such reduction in switch layout may provide the capacity for increased port density per switch.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch for transmitting time domain multiplexed data from a plurality of external input links to a plurality of external output links, the switch comprising:
   a plurality of inputs receiving time domain multiplexed data from external input links;
   a plurality of outputs transmitting time domain multiplexed data to external output links;
   a plurality of intermediate storage units coupled to each of the plurality of inputs, each intermediate storage unit coupled to an input and storing plural input timeslots from the input, all intermediate storage units coupled to an input storing a same set of input timeslots, and each intermediate storage unit providing an interface between the input and a subset of the plurality of outputs; and
   programmable selection storage providing associations of input timeslots to output timeslots for each of the plurality of outputs and enabling transfers of any input timeslot from the intermediate storage units to any output timeslot of the plurality of outputs in a single stage according to the associations reducing a size layout of a single stage grooming switch.

2. The switch of claim 1, wherein the subset of outputs comprises plural outputs.

3. The switch of claim 1, wherein each intermediate storage unit comprises P read ports and R/P intermediate storage units coupled to each input, R being the number of the plurality of outputs, each of the P read ports being coupled to a different output of the plurality of outputs.

4. The switch of claim 3, wherein P is equal to eight (8) ports.

5. The switch of claim 1, wherein:
   each intermediate storage unit comprises 2N locations and N is the number of timeslots in a multiplexing cycle, a first portion of the 2N locations storing a current set of N input timeslots, a second portion of the 2N locations storing a previous set of N input timeslots; and
   the programmable selection storage enabling transfers of any input timeslot from the previous set to any output timeslot of the plurality of outputs.

6. The switch of claim 5, wherein N is equal to forty-eight (48) timeslots.

7. The switch of claim 5, wherein:
   the first portion of the 2N locations stores N input timeslots of a current column from a frame; and
   the second portion of the 2N locations stores N input timeslots of a previous column from a frame.

8. The switch of claim 1, wherein the selection storage provides an address signal to select an input timeslot from an intermediate storage unit and an enable signal to enable an output of the selected input timeslot from one of plural intermediate storage units coupled to different inputs.

9. The switch of claim 1, wherein the selection storage comprises selection storage units, each of the selection storage units being associated with an output, each selection storage unit provides an association of input timeslots to output timeslots of the associated output and enabling transfers of any input timeslot from the intermediate storage units to the output timeslots of the associated output.

10. The switch of claim 1, wherein the plurality of intermediate storage units are demultiplexing register files.

11. The switch of claim 1, wherein each intermediate storage unit comprises N locations and N is the number of timeslots in a multiplexing cycle, and the switch further comprising:

delay memory being coupled to each output, the delay memory storing input timeslots from a previous multiplexing cycle;

for each output, the programmable selection storage enabling a transfer of an input timeslot from a selected intermediate storage unit to the delay memory; and the output reading from the delay memory into an output timeslot when the transferred input timeslot corresponds to a current multiplexing cycle.

12. The switch of claim 11, wherein N is equal to forty-eight (48) timeslots.

13. The switch of claim 11, wherein the output reads directly from the selected intermediate storage unit when the transferred input timeslot corresponds to a previous multiplexing cycle.

14. The switch of claim 11, wherein the multiplexing cycle is a column of a frame having N timeslots, each output comprises an output processor, the output processor overwriting each of the N timeslots of a first column of a frame with a fixed value, the fixed value indicating the first column of the frame, allowing reconfiguration of the associations of input timeslots to output timeslots in the programmable selection storage without data corruption.

15. The switch of claim 1, wherein an intermediate storage unit comprises:

a cell array comprising at least N locations for storing at least N input timeslots, each location in the cell array capable of being read out to plural outputs; and a write select coupled to the cell array for enabling a location in the cell array to be written with data from one of the at least N input time slots.

16. The switch of claim 15, wherein the intermediate storage unit further comprises:

a plurality of read decoders coupled to the cell array, each read decoder coupled to a selection storage unit that provides an association of input timeslots to output timeslots for an output; and each read decoder receiving an address signal from the selection storage unit and selecting an input timeslot from a location in the cell array with the address signal for reading to the output.

17. The switch of claim 16, wherein the intermediate storage unit further comprises:

a comparator;

the comparator receiving an enable signal from the selection storage unit and comparing the enable signal to an input port identifier, the comparator enabling transfer of the selected input timeslot from the cell array onto the output if the enable signal matches the input port identifier.

18. The switch of claim 15, wherein the cell array comprises:

a read circuit;

at least one storage cell; and at least one write circuit;

the write circuit transferring data from an input into the storage cell, the read circuit driving the value in the storage cell onto an output.

19. The switch of claim 18, wherein:

the cell array comprises two or more storage cells, the read circuit being shared across the two or more storage cells.

20. The switch of claim 19, wherein the read circuit is driven by a multiplexer, the multiplexer selecting a storage cell from the two or more storage cells having a value to be read onto an output.

21. The switch of claim 19, further comprises:

a write select circuit; and the cell array further comprising two or more write circuits;

the write select circuit enabling the two or more write circuits to write in succession.

22. The switch of claim 15 wherein the cell array comprises N locations for storing 2N input timeslots, each of the N locations comprising:

a master storage cell;

a slave storage cell;

the at least one write circuit writing an input timeslot into the master storage cell during a column of a frame, the master storage cell transferring the input timeslot into the slave storage cell after the column and before a next column, the input timeslot being read from the slave storage cell by a read circuit during the next column into any output timeslot of the plurality of outputs.

23. The switch of claim 1, wherein each read port of the intermediate storage unit is coupled to plural outputs, which are enabled successively.

24. The switch of claim 23, wherein two or more outputs are coupled to each of the read ports of an intermediate storage unit.

25. The switch of claim 24, wherein the intermediate storage unit is read from the two or more outputs within a single clock cycle, reducing the number of intermediate storage units per input.

26. The switch of claim 13, wherein the multiplexing cycle is a column of a frame, and the switch further comprising:

a clock coupled to the plurality of intermediate storage units providing an operating frequency of C+1 columns per frame interval where C is the number of columns in a frame;

plural input processors, each of the plurality of inputs coupled to one of the plural input processors;

plural output processors, each of the plurality of outputs coupled to one of the plural output processors;

each of the plural input processors writing columns of input frames to the plurality of intermediate storage units at the operating frequency, each input processor performing no operation during a C+1 column interval;

each of the plural output processors reading columns of output frames from the plurality of intermediate storage units or delay memory at the operating frequency, each output processor performing no operation during a first column interval;

the programmable selection storage reconfiguring the associations of input timeslots to output timeslots after the C+1 column interval and before the first column interval.

27. The switch of claim 26, wherein the intermediate storage units operate at a frequency that is C+1/C times the frequency of the plurality of inputs and the plurality of outputs.

28. The switch of claim 27, wherein C is equal to 810 columns.

29. The switch of claim 27, wherein no data is input to the intermediate storage unit during the C+1st column of a frame and no data is output to the output processors during the first column of a frame.

30. The switch of claim 26, wherein an input FIFO is coupled between the input processor and the intermediate storage unit and an output FIFO is coupled between the intermediate storage unit and the output processor.

31. A method for transmitting time domain multiplexed data from a plurality of external input links to a plurality of external output links, comprising:

receiving time domain multiplexed data from external input links to a plurality of inputs;

transmitting time domain multiplexed data to external output links from a plurality of outputs;

coupling a plurality of intermediate storage units to each of the plurality of inputs, each of the plurality of intermediate storage units coupled to an input providing an interface between the input and a subset of the plurality of outputs;

for each input, storing a same set of plural input timeslots from the input in each intermediate storage unit coupled to the input;

providing associations of input timeslots to output timeslots for each of the plurality of outputs;

enabling transfers of any input timeslot from the intermediate storage units to any output timeslot of the plurality of outputs in a single stage according to the associations reducing a size layout of a single stage grooming switch.

32. The method of claim 31, wherein the subset of outputs comprises plural outputs.

33. The method of claim 31, further comprising:

providing each intermediate storage unit with P read ports, each of the P read ports being coupled to a different output of the plurality of outputs; and coupling R/P intermediate storage units to each input, R being the number of the plurality of outputs.

34. The method of claim 33, wherein P is equal to eight (8) ports.

35. The method of claim 31, further comprising:

providing 2N locations in each intermediate storage unit and N is the number of timeslots in a multiplexing cycle;

storing a current set of N input timeslots in a first portion of the 2N locations;

storing a previous set of N input timeslots in a second portion of the 2N locations;

enabling transfers of any input timeslot from the previous set to any output timeslot of the plurality of outputs.

36. The method of claim 35, wherein N is equal to forty-eight (48) timeslots.

37. The method of claim 35, further comprising:

storing a current column from a frame in the first portion of the 2N locations; and storing a previous column from a frame in the second portion of the 2N locations.

38. The method of claim 31, wherein enabling transfers of any input timeslot to any output timeslot further comprises:

providing an address signal to select an input timeslot from an intermediate storage unit; and providing an enable signal to enable an output of the selected input timeslot from one of plural intermediate storage units coupled to different inputs.

39. The method of claim 31, further comprising:

providing a plurality of selection storage units for enabling the transfers of any input timeslot from the intermediate storage units to the output timeslots of the plurality of outputs; and associating each of the plurality of selection storage units with an output, each selection storage unit providing an association of input timeslots to output timeslots of the associated output.

40. The method of claim 31, wherein the plurality of intermediate storage units are demultiplexing register files.

41. The method of claim 31, further comprising:

providing N locations in each intermediate storage unit and N is the number of timeslots in a multiplexing cycle;

coupling delay memory to each output, the delay memory storing input timeslots from a previous multiplexing cycle;

for each output, enabling a transfer of an input timeslot from a selected intermediate storage unit to the delay memory;

reading from the delay memory into an output timeslot of the output when the transferred input timeslot corresponds to a current multiplexing cycle.

42. The method of claim 41, wherein N is equal to forty-eight (48) timeslots.

43. The method of claim 41, further comprising:

reading directly from the selected intermediate storage unit when the transferred input timeslot corresponds to a previous multiplexing cycle.

44. The method of claim 41, wherein the multiplexing cycle is a column of a frame having N timeslots, the method further comprising:

overwriting each of the N timeslots of a first column of a frame with a fixed value, the fixed value indicating the first column of the frame, allowing reconfiguration of the association of input timeslots to output timeslots without data corruption.

45. The method of claim 31, further comprising:

providing a cell array for each intermediate storage unit comprising at least N locations for storing at least N input timeslots, each location in the cell array capable of being read out to plural outputs; and enabling a location in the cell array to be written with data from one of the at least N input time slots with a write select coupled to the cell array.

46. The method of claim 45, further comprising:

coupling a plurality of read decoders to the cell array;

coupling each of the plurality of read decoders to a selection storage unit that provides an association of input timeslots to output timeslots for an output;

transmitting an address signal from the selection storage unit to a read decoder; and selecting an input timeslot from a location in the cell array with the address signal for reading to the output with the read decoder.

47. The method of claim 40, further comprising:

providing a comparator to each intermediate storage unit;

transmitting an enable signal from the selection storage unit to the comparator;

comparing the enable signal to an input port identifier with the comparator; and enabling transfer of the selected input timeslot from the cell array onto the output with the comparator if the enable signal matches the input port identifier.

48. The method of claim 45, further comprising:

providing the cell array with a read circuit;

providing the cell array with at least one storage cell;

providing the cell array with at least one write circuit;

transferring data from an input into the storage cell with the at least one write circuit; and driving the value in the storage cell onto an output with the read circuit.

49. The method of claim 48, wherein the cell array comprises two or more storage cells, the method further comprising:

sharing the read circuit across the two or more storage cells.

50. The method of claim 49, further comprising:

driving the read circuit with a multiplexer by selecting a storage cell from the two or more storage cells having a value to be read onto an output.

51. The method of claim 49, wherein the cell array comprises two or more write circuits, the method further comprising:

coupling a write select circuit to the cell array;

enabling the two or more write circuits to write in succession with the write select circuit.

52. The method of claim 45 wherein the cell array comprises N locations for storing 2N input timeslots, and further comprising:

providing a master storage cell and a slave storage cell for each of the N locations;

writing an input timeslot into the master storage cell during a column of a frame with the at least one write circuit;

transferring the input timeslot from the master storage cell into the slave storage cell after the column and before a next column; and reading the input timeslot from the slave storage cell by a read circuit during the next column into any output timeslot of the plurality of outputs.

53. The method of claim 31, further comprising:

coupling each read port of the intermediate storage unit to plural outputs; and enabling each of the plural outputs coupled to the read port successively.

54. The method of claim 53, wherein two or more outputs are coupled to each read port of the intermediate storage unit.

55. The method of claim 54, further comprising:

reading the intermediate storage unit from the two or more outputs within a single clock cycle, reducing the number of intermediate storage units per input.

56. The method of claim 41, further comprising:

providing an operating frequency of C+1 columns per frame interval where C is the number of columns in a frame;

writing columns of input frames to the plurality of intermediate storage units at the operating frequency;

performing no write operation during a C+1 column interval;

reading columns of output frames from the plurality of intermediate storage units or delay memory at the operating frequency;

performing no read operation during a first column interval; and reconfiguring the associations of input timeslots to output timeslots after the C+1 column interval and before the first column interval.

57. The method of claim 56, wherein the intermediate storage units operate at a frequency that is C+1/C times the frequency of the plurality of inputs and the plurality of outputs.

58. The method of claim 57, wherein C is equal to 810 columns.

59. The method of claim 57, further comprising:

inputting no data to the intermediate storage unit during the C+1st column of a frame; and outputting no data to the output processors during the first column of a frame.

60. The method of claim 56, further comprising:

coupling an input FIFO between the input processor and the intermediate storage unit; and coupling an output FIFO between the intermediate storage unit and the output processor.

61. A switch for transmitting time domain multiplexed data from a plurality of external input links to a plurality of external output links, the switch comprising:

a plurality of inputs receiving time domain multiplexed data from external input links;

a plurality of outputs transmitting time domain multiplexed data to external output links;

a plurality of storage means for storing plural input timeslots from an input and for providing an interface between the input and a subset of the plurality of outputs; and means for providing associations of input timeslots to output timeslots for each of the plurality of outputs and for enabling transfers of any input timeslot from the plurality of storage means to any output timeslot of the plurality of outputs in a single stage according to the associations reducing a size layout of a single stage grooming switch.

* * * * *